US011817952B2

(12) United States Patent
Adams-Waite et al.

(10) Patent No.: US 11,817,952 B2
(45) Date of Patent: Nov. 14, 2023

(54) SYSTEMS AND METHODS FOR PROVIDING END-TO-END DATA PROTECTION

(71) Applicant: Dialog Semiconductor (UK) Limited, London (GB)

(72) Inventors: Carl Adams-Waite, Newcastle-under-Lyme (GB); Robert Waterworth, Bristol (GB)

(73) Assignee: Dialog Semiconductor (UK) Limited, London (GB)

( * ) Notice: Subject to any disclaimer, the term of this patent is extended or adjusted under 35 U.S.C. 154(b) by 108 days.

(21) Appl. No.: 17/588,832

(22) Filed: Jan. 31, 2022

(65) Prior Publication Data

US 2023/0246740 A1 Aug. 3, 2023

(51) Int. Cl.
*H04L 1/00* (2006.01)
*H04L 61/2503* (2022.01)

(52) U.S. Cl.
CPC .......... *H04L 1/0063* (2013.01); *H04L 1/0043* (2013.01); *H04L 1/0052* (2013.01); *H04L 61/2503* (2013.01)

(58) Field of Classification Search
CPC ... H04L 1/0063; H04L 1/0043; H04L 1/0052; H04L 61/2503; H04L 1/0057; H03M 13/093; H03M 13/096; G06F 11/1076; G06F 11/1004; G06F 11/2007
USPC ........................................ 714/752, 758, 759
See application file for complete search history.

(56) References Cited

U.S. PATENT DOCUMENTS

| 11,263,077 | B1* | 3/2022 | Seznayov | G06F 3/064 |
| 2007/0165673 | A1* | 7/2007 | Huang | H04L 1/0057 |
| | | | | 370/474 |
| 2009/0323729 | A1* | 12/2009 | Simon | H04L 1/007 |
| | | | | 370/509 |
| 2015/0106682 | A1* | 4/2015 | Grocutt | G06F 11/1004 |
| | | | | 714/807 |

(Continued)

OTHER PUBLICATIONS

Arm® CoreLink™ CMN-600AE Coherent Mesh Network Revision: r1p0, Technical Reference Manual, Copyright © 2019 Arm Limited or its affiliates, Jun. 14, 2019, relevant sections—1 Introduction 1.3 Features, pp. 1-16 to 1-19, and 3 Functional safety features, 3.1 Overview, pp. 3-154 to 3-167.

(Continued)

*Primary Examiner* — Albert Decady
*Assistant Examiner* — Osman M Alshack
(74) *Attorney, Agent, or Firm* — Saile Ackerman LLC; Stephen B. Ackerman (57) ABSTRACT

A system for providing end-to-end data protection between a transmitting end device and a receiving end device is presented. The system has a transmitting end device to calculate a first check value for a first message, which has first and second data blocks; the receiving end device; and a remapping device. The remapping device is configured to remap a data block among the first and second data blocks for generating a second message for the receiving end device. The remapping device also determines a remapping value based on the data block and the remapped data block, such that a second check value that would be calculated for the second message would be equal to the first check value, and wherein the second message comprises the other one of the first and second data blocks, the remapped data block, and the remapping value.

26 Claims, 5 Drawing Sheets

(56) References Cited

U.S. PATENT DOCUMENTS

| | | | | |
|---|---|---|---|---|
| 2015/0278008 | A1* | 10/2015 | Ren | H04L 1/0045 |
| | | | | 714/776 |
| 2016/0329987 | A1* | 11/2016 | Pang | G06F 11/1004 |
| 2016/0337083 | A1* | 11/2016 | Englert | H04L 1/0061 |
| 2019/0158125 | A1* | 5/2019 | Carlough | H04L 1/0041 |
| 2020/0313798 | A1* | 10/2020 | Hald | H04W 12/041 |
| 2021/0218418 | A1* | 7/2021 | Noh | H04L 1/00 |
| 2022/0337270 | A1* | 10/2022 | Kim | H04L 1/0041 |
| 2022/0350929 | A1* | 11/2022 | Rieger | G06F 11/0751 |

OTHER PUBLICATIONS

Cortex™—-R5 Revision: r1p2, Technical Reference Manual, Copyright © 2010-2011 ARM, Aug. 3, 2010, relevant section: 9.1 About the L2 interface, 9.1.1 Bus ECC, pp. 9-2 to 9-4.

* cited by examiner

SYSTEMS AND METHODS FOR PROVIDING END-TO-END DATA PROTECTION

TECHNICAL FIELD

The present disclosure is generally directed to techniques for providing end-to-end data protection, and more particularly to techniques of modification of data to prevent recalculation of check values.

BACKGROUND

In the general technical fields where the provision of end-to-end data protection would become necessary (e.g., automotive industry), check values, e.g., CRC (cyclic redundancy check), may typically be used or applied over the data. Of course, other suitable check values, such as bit sum, Berger code, etc. are also possible, though they would likely provide lower coverage and/or have other downsides, such as being dependent on the modified data length, etc. For ease of description, throughout the present disclosure, CRC is used as an example (but not as a limitation of any kind). However, as will be understood and appreciated by the skilled person, the techniques proposed in the present disclosure may be applicable to other similar check values as well (possibly with minor modification and/or adaptation, if necessary).

In the exemplary technical context of CRC when being used in a bus-based system (e.g., an Advanced High-performance Bus (AHB) system or an AHB Lite system typically used in the automotive industry), when performing a write, a master (device) may generally add a CRC over the entire address and (payload) data. Accordingly, a slave (device) may generally check that is valid on receiving it. However, such a general approach may become problematic and cause issues when so-called "remappers" (or remapping devices) are being deployed between (a signal path) of the master and slave.

Figure 1:
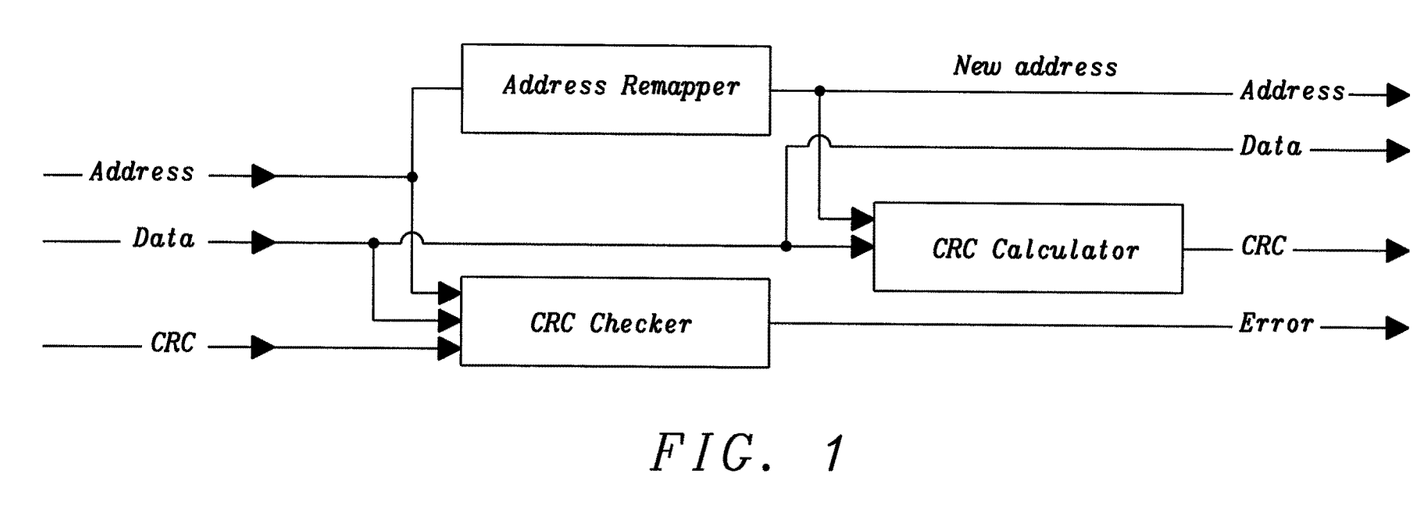

Broadly speaking, (address) remappers are considered to be a key part of IP reuse (e.g., instead of hardcoding a block's target addresses into the IP, it streams out addresses 0 . . . END and the remapper block (device) may send this to the correct address). This allows the block IP to be verified once and then used everywhere, instead of having to verify it for every project. However, since the CRC is generally added over both the address and data regions as illustrated above, it would have to be recomputed by the remapper. Conventionally, the remapper would have to recalculate the check value whenever the data frame is partially (or completely) changed. An exemplary possible implementation using the general concept of recomputation of the CRC is schematically shown in FIG. 1.

Such conventional technique would generally introduce new failure mechanisms, which then must be protected against. In addition, existing solutions would also have to capture the address stage in order to calculate the new CRC, causing additional area within the remapper.

In some other cases, duplication of the bus may also be used, however at the cost of causing additional area overhead.

To summarize, in order to implement the conventional schemes as illustrated above, engineers would generally have to choose (trade-off) amongst:

large additional area associated with the parallel calculation of CRC;
 additional cycle delays during CRC calculation, slowing down the bus; or
 adding the remapper within the IP block—which in turn may mean that the block would have to be at least partially re-verified after each register map change, potentially causing issues for late stage changes.

SUMMARY

In view thereof, broadly speaking, the focus of the present disclosure is to propose techniques for enabling end-to-end data protection, and more particularly, to techniques of modification of data to prevent recalculation of check values.

In view of some or all of the above technical problems, broadly speaking, the present disclosure provides techniques for providing end-to-end protection over a communication channel, where the message is partially changed, without the need to check or recompute the check value. In particular, the present disclosure generally provides systems for providing end-to-end data protection, as well as corresponding methods, having the features of the respective independent claims.

According to an aspect of the disclosure, there is provided a system for providing end-to-end data protection between a transmitting end/side device (or simply a transmitter) and a receiving end/side device (or simply a receiver). The system may be a bus-based system (e.g., an Advanced High-performance Bus (AHB) system or an AHB Lite system typically used in the automotive industry) or any other suitable system, as will be understood and appreciated by the skilled person. Further, as used herein, the term end-to-end data protection generally refers to the scenario where a transmitter sends a message (e.g., in the form of address, control signals (e.g., read/write access), (payload) data, etc.) to a receiver over a communication channel, and if the message is corrupted in the channel, the receiver should be able to detect such corrupted message (error) in (almost) all cases. As will be understood and appreciated by the skilled person, such end-to-end protection may be provided or achieved by using any suitable means, such as the techniques of check values. Broadly speaking, check values may be generally seen as redundant information contained in the message that is used to check whether the data has been corrupted (e.g., during transmission). Any suitable check values may be used, such as CRC, Hamming, or any other suitable codes. Depending on various implementations, the check values may be determined (e.g., calculated) by using any suitable means, such as any suitable error detection algorithm. It may also be worthwhile to note that, as used herein, the terms transmitting end device and receiving end device should be understood as names used for indicating respective roles (e.g., initiating operations, checking check values, or detecting errors) in the end-to-end protection, but not being associated with hierarchical positions in the system. That is to say, in simple words, the transmitting end device may be simply seen as attempting to access a certain address in receiving end device. Put differently, the transmitting end device may be generally seen as a device initiating corresponding operations (e.g., read, write, etc.) and calculating the check value for the first time; while the receiving end device may be generally seen as a device performing the corresponding operations (e.g., read, write, etc.) and (re-)calculating the check value for detecting possible errors during transmission. For instance, taking a bus system as an illustrative example, in some possible implementations (e.g., during a bus write operation), the transmitting end device may be (but does not necessarily have to be) a master device, and the receiving end device may be (but does not necessarily have to be) a slave device. On the other hand, in some other possible implementations (e.g., during a bus read operation), the transmitting end device may be (but does not necessarily have to be) a slave device, and the receiving end device may be (but does not necessarily have to be) a master device.

In particular, the system may comprise the transmitting end device, the receiving end device, and a remapping device (or referred to as a remapper). More particularly, the transmitting end device may be configured to calculate (e.g., compute) a first check value for a first message, wherein the first message may comprise (among others) a first data block and a second data block. It is to be noted that, as used herein throughout the present disclosure, the expressions "first" and "second" should be understood as being merely used as indications of occurrence (being mentioned) in the chronological order, but not as indications of specific (arrangement) orders (e.g., a sequence when being arranged/encapsulated in a message), unless specifically illustrated otherwise. Further, the remapping device may be arranged (placed) in a signal path between the transmitting end device and the receiving end device. The remapping device may be configured to remap (e.g., modify) a data block among the first and second data blocks or a part thereof for generating a second message for the receiving end device. Specifically, the remapping device may be further configured to determine a remapping value based on the data block and the remapped data block, such that a second check value that would be calculated (e.g., computed) for the second message would be equal to the first check value (e.g., calculated by the transmitting end device), wherein the second message may comprise the other one of the first and second data blocks, the remapped data block, and the remapping value. Put differently, the second message may be considered as largely corresponding (identical) to the first message except for that a data block among the first and second data blocks or a part thereof may have been remapped (modified) by the remapping device, such that the second message would now contain that remapped data block (compared to the unmodified first message). Finally, it is to be noted that, as used herein, the first and second messages may be (but do not necessarily have to be) encapsulated (e.g., coded) in accordance with certain format (e.g., depending on certain protocols being used). In some possible cases, the first and second messages may be understood in a broad sense to simply refer to a collection of certain elements/components.

Configured as proposed above, specifically by calculating and inserting the remapping value (by the remapping device), in cases when a message (e.g., a data block therein) is partially updated/remapped/modified for example by a "remapper", the check value over the whole (partially updated) message would still be correct. As such, the old check value would generally not need to be confirmed to be correct when performing the partial update (by a remapping device or remapper). This could save processing power and/or area on the remapper, especially if most of the message is unmodified. In contrast, in conventional techniques, a new check value would have to be generated whenever the message is partially updated by a remapping device. Generating a new check value would generally require first checking whether the old message (before being remapped) is still valid since otherwise it could have been corrupted between the transmitter and the remapper. Furthermore, since the remapper block would generally have no way of generating "good values", i.e., a CRC generation logic, it is inherently safe. In other words, any fault in the remapper would be able to be detected by the receiver. Yet further, in some possible cases, if all mappings between the old data blocks (i.e., before remapping) and the new data blocks (i.e., after remapping) are already known, then the remapping values may be computed in advance, thereby significantly reducing the complexity and area of the remapper itself. In addition, by using the techniques as proposed in the present disclosure, it may be possible to further allow for a more robust system design that may be futureproofing against standards updates. IP reuse could also be achieved, saving valuable development and verification time.

In some embodiments, the first data block may be payload data, and the second data block may be a first address associated with the payload data. As indicated above, the first and second data blocks defined as such should not be understood as limiting the specific arrangement (order) of such first and second data blocks with the first and second messages. As will be understood and appreciated by the skilled person, in practice, the payload data may be arranged preceding or succeeding the associated address within the first and second messages, depending on various implementations and/or requirements.

In some embodiments, the remapping device may be configured to remap (modify) the first address into a second address indicating the receiving end device. That is to say, the remapping device may be configured to remap (modify) the first address into the second address for the receiving end device, so that the receiving end device may be able to successfully access that second address (e.g., in order to perform necessary operations, such as read, write, etc.)

In some embodiments, the remapping device may be configured to determine (e.g., calculate, obtain, etc.) the remapping value based on the first and second addresses independently from the payload data. In other words, the remapping value may be calculated (or obtained) by using the first (old, before remapping) and second address (new, after remapping) only—independent of the message length and (payload) data value. This allows for efficient implementation.

In some embodiments, the first message may further comprise a padding block. In some possible cases, such padding block may also be referred to as (a block of) padding (bits) or any other suitable term. Notably, as can be understood and appreciated by the skilled person, such padding block may be initialized to any suitable value (e.g., all padding bits in the padding block may be, but do not necessarily have to be, initialized to 0). In particular, a length of the padding block may be equal to a length of the remapping value, and the padding block may later be replaced by the remapping value in the second message. As such, in some possible implementation, the first check value may be considered as being calculated (by the transmitting end device) by taking said padding block into account as well, since, generally speaking, the first check value is calculated over the entire first message. However, as will be understood and appreciated by the skilled person, in some possible implementation, said padding block may be (intentionally) left out (skipped) by the transmitting end device when calculating the first check value. Of course, any other suitable implementation may be possible as well, as long as it has been agreed in advance within the system.

In some embodiments, the second message may further comprise a remapping flag indicative of whether the remapping device has performed the remapping. That is to say, in some possible implementations, the remapping operation may be (completely) skipped. A possible exemplary scenario (but not as a limitation of any kind) may be, in some standards (or protocols), such as Ethernet, it may be an option for allowing the remapping to be skipped entirely, thereby making the (ethernet) protocol backward compatible. Such remapping flag may be implemented in any suitable means (e.g., as simple as 1 bit have a value of either 0 or 1), as will be understood and appreciated by the skilled person.

In some embodiments, the second check value may be calculated further based on the remapping flag, and the remapping value may be determined further based on the remapping flag. In other words, when calculating the second check value, the receiving end device may take the remapping flag into account, since, generally speaking, the second check value is calculated over the entire second message. Accordingly, the remapping device would have to, when determining the remapping value, take the remapping flag into account as well.

In some embodiments, the system may comprise a plurality of sequential remapping devices in the signal path (e.g., sequentially arranged or coupled between the transmitting end device and the receiving end device). In particular, similar to the single remapping device case, a subsequent remapping device (among the plurality of sequential remapping devices) may be configured to remap a data block among the first and second data blocks or a part thereof that has been remapped by a preceding remapping device. Moreover, each remapping device (in the plurality of sequential remapping devices) may be configured to determine a respective remapping value. Put differently, all remapping devices other than the last remapping device in the plurality of sequential remapping devices may be configured to generate a respective (intermediate) remapped data block and a respective (intermediate) remapping value thereof (for the subsequent remapping device for further remapping and re-determining the remapping value); while the last remapping device in the plurality of sequential remapping devices may be configured to generate a (final) remapped data block and a (final) remapping value (for the receiving end device to perform corresponding operations associated with the (final) remapped data block and to calculate the second check value for detecting possible errors during transmission).

In some embodiments, the second message may comprise the other one of the first and second data blocks (i.e., the data block or a part thereof not being remapped), the remapped data block, and the remapping values that are determined by the plurality of remapping devices. In other words, the second check value is to be calculated by taking, among others, all (intermediate and final) remapping values that have been determined by the plurality of remapping devices into account. In such cases, similar to above, the first message may correspondingly comprise a count of the padding blocks, and the count of the padding blocks may correspond (e.g., equal) to the number of the plurality of sequential remapping devices in the signal path.

In some embodiments, the subsequent remapping device (among the plurality of sequential remapping devices) may be configured to determine the remapping value further based on the remapping values that have been determined by any preceding remapping devices. And accordingly, the second message may comprise the other one of the first and second data blocks, the remapped data block, and the respective remapping value that is determined by a last remapping device of the plurality of remapping devices. That is to say, compared to the above illustrated possible embodiments where all (intermediate and final) remapping values that have been determined by the plurality of remapping devices are included in the second message, in the present case, only the remapping value that is determined by the last remapping device is to be included in the second message, and consequently, to be used for calculating the second check value. Accordingly, only one padding block may be necessary to be included in the first message.

In some embodiments, the first address may be arranged preceding (before) the payload data in the first message. Accordingly, in some other possible implementations, the first address may be arranged succeeding (after) the payload data in the first message as well. Nevertheless, as will be understood and appreciated by the skilled person, arranging the address before the data may have some benefit(s) in certain cases. For instance, taking CRC as an illustrative example, if the address is arranged first and the data is arranged second, upon receipt of that first message by the remapping device, the state of the CRC would be known—it is the initialization value of the CRC, thereby allowing the remapping device to be able to determine (calculate) the remapping value based on the address (before and after remapping) independently from the payload data. Conversely, if the data is arranged first, however, the CRC would unfortunately be in an unknown state, and thus would need to be calculated based on the data as well.

In some embodiments, the second address may be arranged preceding the payload data in the second message. That is, the arrangement of the address as well as the payload data may be consistent between the first and second messages (i.e., before and after the remapping).

In some embodiments, the remapping value may be inserted between the second address and the payload data in the second message.

In some embodiments, the padding block may be accordingly inserted between the first address and the payload data in the first message. That is, the arrangement of the remapping value within the second message may be in consistence with the arrangement of the padding block within the first message.

In some embodiments, the remapping device may be configured to remap the payload data or a part thereof. That is, in some possible implementations, instead of remapping the address associated with the payload data, the remapping device may be configured to remap (modify) the payload itself (or a part thereof).

In some embodiments, an error detection algorithm used for calculating the first and second check values may involve XOR operations. For instance, depending on various implementations, the XOR operations may be nibble-wise XOR operations.

In some embodiments, the remapping value may be determined based on an inverse of an error detection algorithm used for calculating the first and second check values. For instance, the inverse of the error detection algorithm may involve XOR (e.g., nibble-wise) operations.

In some embodiments, the remapping value may be determined from a lookup table (LUT) or a linear (polynomial) equation. In particular, the LUT may be used in cases where all mappings between the old data blocks (i.e., before remapping) and the new data blocks (i.e., after remapping) may be already known, so that the remapping values could be computed and stored into the LUT in advance. Thereby, the complexity and area of the remapper itself may be significantly reduced.

In some embodiments, an error detection algorithm used for calculating the first and second check values is a cyclic redundancy check (CRC) based algorithm. Of course, as indicated above already, any other suitable algorithm or check value implementation (e.g., polynomial-based) may be used as well, as will also be understood and appreciated by the skilled person.

In some embodiments, a length of the remapping value may be greater than or equal to a length of the check value calculated by using the CRC-based algorithm. In particular, the case where the length of the remapping value equals the length of the check value calculated by using the CRC may be considered as one of the efficient implementations (e.g., in terms of overhead), it is nevertheless also possible to implement the remapping value having the length greater than (e.g., by just 1 bit) the length of the check value, depending on various circumstances.

In some embodiments, the remapping device may be configured to, before performing the remapping: calculate a check value based on the received first message sent from the transmitting end device; and compare the check value with the first check value, for detecting errors between the transmitting end device and the remapping device. That is to say, depending on various implementations and/or requirements, it is also possible to include a (separate or dedicated) CRC checker within the remapper itself, thereby increasing the granularity of error detection. However, this may be decided up to specific implementations taking into account the tradeoff between ease of debugging and design area.

In some embodiments, the system may a bus-based (e.g., the AHB) system, and the transmitting end device may be a master device, the receiving end device may be a slave device, or vice versa, as illustrated above.

In some embodiments, the payload data may comprise (other than for example the user data) control signals indicative of operations (e.g., bus read, bus write, or any other suitable bus related operations) for buses of the bus-based system.

In some embodiments, the system may be an ethernet-based system.

In some embodiments, the remapping device may be or form a part of a network address translation (NAT) device. As can be understood and appreciated by the skilled person, the NAT techniques may generally refer to mapping an IP address space into another by modifying network address information in the IP header of packets when in transit across a traffic routing device. In such cases, the first address at the transmitting end device may be remapped to the second address for (associated with) the receiving end device.

According to another aspect of the present disclosure, there is provided a method for providing end-to-end data protection between a transmitting end device and a receiving end device.

In particular, the method may comprise calculating, by the transmitting end device, a first check value for a first message, wherein the first message may comprise a first data block and a second data block. The method may further comprise remapping, by a remapping device in a signal path between the transmitting end device and the receiving end device, a data block among the first and second data blocks or a part thereof. The method may yet further comprise determining, by the remapping device, a remapping value based on the data block and the remapped data block. Finally, the method may comprise generating, by the remapping device, a second message for the receiving end device, wherein the second message may comprise the other one of the first and second data blocks, the remapped data block, and the determined remapping value. More particularly, the remapping value may be determined such that a second check value that would be calculated for the second message by the receiving end device would be equal to the first check value.

Configured as proposed above, specifically by calculating and inserting the remapping value (by the remapping device), in cases when a message (e.g., a data block therein) is partially updated/remapped/modified for example by a "remapper", the check value over the whole (partially updated) message would still be correct. As such, the old check value would generally not need to be confirmed to be correct when performing the partial update (by a remapping device or remapper). This could save processing power and/or area on the remapper, especially if most of the message is unmodified. In contrast, in conventional techniques, a new check value would have to be generated whenever the message is partially updated by a remapping device. Generating a new check value would generally require to first check whether the old message (before being remapped) is still valid since otherwise it could have been corrupted between the transmitter and the remapper. Furthermore, since the remapper block would generally have no way of generating "good values", i.e., a CRC generation logic, it is inherently safe. In other words, any fault in the remapper would be able to be detected by the receiver. Yet further, in some possible cases, if all mappings between the old data blocks (i.e., before remapping) and the new data blocks (i.e., after remapping) are already known, then the remapping values may be computed in advance, thereby significantly reducing the complexity and area of the remapper itself. In addition, by using the techniques as proposed in the present disclosure, it may be possible to further allow for a more robust system design that may be futureproofing against standards updates. IP reuse could also be achieved, saving valuable development and verification time.

Details of the disclosed method can be implemented as systems (e.g., in the form of circuitry) adapted to execute some or all of the steps of the method, and vice versa, as the skilled person will appreciate. In particular, it is understood that methods according to the disclosure relate to methods of operating the systems (or circuitry) according to the above embodiments and variations thereof and that respective statements made with regard to the systems (or circuitry) likewise apply to the corresponding methods, and vice versa.

It is also understood that in the present document, the term "couple" or "coupled" refers to elements being in electrical communication with each other, whether directly connected e.g., via wires or in some other manner (e.g., indirectly). Notably, one example of being coupled is being connected.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates an example of a possible implementation using recomputation of the CRC, FIG. 2 schematically illustrates an exemplary overview of bus design using a remapper according to embodiments of the present disclosure, FIG. 3 schematically illustrates an example of a timing diagram of bus write operations with CRC according to embodiments of the present disclosure, FIG. 4 schematically illustrates an example of a timing diagram of bus read operations with CRC according to embodiments of the present disclosure.

DESCRIPTION

As indicated above, identical or like reference numbers in the present disclosure may, unless indicated otherwise, indicate identical or like elements, such that repeated description thereof may be omitted for reasons of conciseness.

As can be understood and appreciated by the skilled person, conventionally speaking, in many existing protocols a message that is exchanged (e.g., between a transmitter and a receiver) within a system is typically protected using a check value over the (entire) address and data portions (regions), which generally means that the address and data are somehow linked or associated, so that an incorrect address (say from the previous cycle) with the correct data would still be detected by the check value. In some other possible cases, separate check values over the address and data portions (regions) may be implemented (e.g., calculated), however at the cost of reduced efficiency.

In view thereof, in a broad sense, the present disclosure generally proposes techniques for providing end-to-end protection over a communication channel, where the message is partially changed, without the need to check or recompute the check value. Put differently, even if a message is partially updated, such as the address being modified by a remapper, the techniques proposed in the present disclosure could be applied such that the check value over the whole message is still correct. That is to say, even in cases when the part of the data is being changed (e.g., by a remapper or remapping device), it may not be necessary to read the entire message or to check that it contains the correct check value, or it may not be necessary to (re-)calculate the check value over the whole message again (since only part of the data is being modified). Broadly speaking, this is achieved by determining and inserting a remapping value into the message, as will be discussed in more detail below.

As illustrated earlier, check values may be generally seen as redundant information contained in the message that is used to check whether the data has been corrupted (e.g., during transmission). Any suitable check values may be used, such as CRC (cyclic redundancy check), Hamming, or other suitable codes, as will be understood and appreciated by the skilled person. Moreover, as described herein, a message may be considered to typically consist of address, control signals (e.g., read/write access), and data, though it may depend on the protocol being used at the end. Throughout the document, control signals may be considered to be treated as part of the (payload) data for reasons of brevity, unless indicated otherwise. For instance, in the case of a read (operation), the transmitter (or transmitting device) may typically send the address and control signals (e.g., in the form of a message), and the receiver (or receiving device) may correspondingly send (access) the (user) data associated with that address. The transmitter may send a message to the receiver over a communication channel. If the message is corrupted in the channel, the receiver should generally be able to detect such error in (almost) all cases. In some possible cases, it may be difficult to check all cases, since it might be possible to corrupt the data enough to hit another codeword. As an illustrative example, for CRC of length N, the probability of this happening with random data may be $\sim 2^{-N}$. In some use cases, parts of the message may be changed by the channel, sometimes on purpose. For example, the address may be changed, as is done by a network address translation (NAT) device, in some deployment scenarios.

Notably, as mentioned earlier, for ease of description, CRC is used as an example (but not as a limitation of any kind) throughout the present disclosure. However, as will be understood and appreciated by the skilled person, the techniques proposed in the present disclosure may be applicable to other similar check values as well (possibly with minor modification and/or adaptation, if necessary).

Now, before going into details of the possible embodiments of the present disclosure, it may be assumed that the system as exemplified herein may, in its simplest form, consists of three parts, namely: a transmitter (or a transmitting end/side device), a remapper (or a remapping device), and a receiver (or a receiving end/side device), for ease of description. Of course, as will be understood and appreciated by the skilled person, in practice (i.e., in real-life implementations), the system may certainly comprise any other suitable elements/components, if necessary.

Generally speaking, in such a system configuration, the transmitter would generally attempt to access a certain address in (or associated with) the receiver. For the sake of conciseness, throughout the present disclosure, this may be illustratively indicated or shown in the form of a (first) "message" as:

{ADDR,DATA,CRC}, wherein "ADDR" generally denotes the address being attempted to be accessed from the transmitter's perspective, "DATA" generally denotes the payload data (which may comprise control signals as well, as illustrated above), and "CRC" generally denotes the calculated check value by using the appropriate CRC (algorithm). As indicated earlier, as used herein, the "message" as such may be (but do not necessarily have to be) encapsulated (e.g., coded) in accordance with certain format (e.g., depending on the corresponding protocols being used). However, it should be noted that the "message" may as well be understood in a broad sense to simply refer to a (virtual) collection of certain elements/components, i.e., without necessarily encoding (or concatenating) them.

Now if this address ("ADDR") is known to the remapper, then the address would be changed (remapped) for the receiver—such that the receiver would now see:

{NEW_ADDR,DATA,CRC}, wherein "NEW_ADDR" generally denotes the remapped (modified) address from the receiver's perspective.

Due to such a change in address, the original CRC would be incorrect. To prevent this from happening, by applying the proposed techniques of the present disclosure, the remapper would have to determine (e.g., calculate) and send a remapping value (sometimes also being denoted as "remap_value" throughout the present disclosure) that causes the original CRC over the address+data regions to still be correct, even though a new address is being used.

In some possible implementations, the remapping value(s) may be pre-calculated if all from-to address pairs are known, for example in the case of a bus implemented in hardware. In such cases, the (pre-calculated) remapping values may for example be pre-stored in a lookup table (LUT) for ease of access/retrieval later, thereby significantly reducing the complexity and area of the remapper itself.

Depending on various implementations and/or requirements, the remapping values may be determined for example to be at least the same length as (i.e., greater than or equal to) the CRC (denoted as "CRC_LEN" throughout the present disclosure). This length would generally allow the remapping value to be able to map any CRC value onto any other CRC value. Depending on various CRC implementations in practice, this would for example be 8 bits (as being used and shown in the illustrative examples below), or any other suitable length value. Similarly, if other types of check values were to be used or implemented, lengths may vary for those check value implementations accordingly, as will be understood and appreciated by the skilled person.

The (second) message received by the receiver is now:

{NEW_ADDR,remap_value,DATA,CRC}

In some possible implementations, the remapping value may depend on the old and new address only, i.e., is independent of data value and data length.

For ease of understanding, below Table 1 schematically shows some possible examples of the remapping values in view of the old (initial) addresses as well as the new (final) address. Notably, the last column in the below table is calculated from the first three and is mainly shown for reference.

TABLE 1

| Initial Address | Final Address | Remap Value | CRC8_8H2F (= CRC{initial_address, 0x00} == CRC{final_address, remap_value}) |
|---|---|---|---|
| 0x00 0x00 0x00 | 0xAA 0x55 0xAA | 0x5A | 0x12 |
| 0x11 0x11 0x11 | 0x22 0x22 0x22 | 0xCA | 0xF3 |
| 0xAA 0x55 0xAA | 0xFF 0x00 0xFF | 0x71 | 0x53 |
| 0x00 0x00 0x00* | 0x00 0x00 0x00 | 0x00 | 0x12 |
| 0x00 0x00 0x01* | 0x00 0x00 0x01 | 0x00 | 0xFB |

*Trivial cases, since no remapping present generally mean that final address == initial address and remap_value == 0.

For instance, stepping through the example as shown in the first row using the specific "CRC8_8H2F" algorithm (as indicated in the last column of Table 1), e.g., with the help of some possible online:
the initial address of 0x00 0x00 0x00 0x00 (where the last 0x00 shown in bold is generally inserted as padding zeros) gives the CRC value of 0x12;
while the final address (e.g., after remapping) 0xAA 0x55 0xAA 0x5A (where the 0x5A shown in bold is the respective remapping value calculated in the third column of Table 1) also gives the same CRC value of 0x12.

The nature of both of them having the same CRC at this point (i.e., after the byte of 0s for the initial address and the remap_value for the final address as illustrated above) is that the CRC unit is in exactly the same state. For all it knows, the data up to this point has not changed (in other words, not corrupted). In other words, this generally means that the CRC calculated over the whole message is unchanged.

It would be rather easy to check or verify this (e.g., using the same online "CRC8_8H2F" calculator as used above). For instance, taking the first row of as an example:

| Input data | CRC |
|---|---|
| 0x00 0x00 0x00 0x00 0xDE 0xAD 0xBE 0xEF | 0xD8 |
| 0xAA 0x55 0xAA 0x5A 0xDE 0xAD 0xBE 0xEF | 0xD8 | where, as illustrated above, the 0x00 shown in bold in the first row generally denotes the padding byte; and the 0x5A shown in bold in the second row generally denotes the respective remapping value. From the above table, it may be perceived that the same CRC value of 0xD8 can be achieved for messages before and after remapping (both including the same (unmodified) data of "0xDE 0xAD 0xBE 0xEF" in underline).

The same can be shown for the others, e.g., the second row in Table 1:

| Input data | CRC |
|---|---|
| 0x11 0x11 0x11 0x00 0xDE 0xAD 0xBE 0xEF | 0xB7 |
| 0x22 0x22 0x22 0xCA 0xDE 0xAD 0xBE 0xEF | 0xB7 |

Similarly, the same would also hold even for different data (including different data lengths), and so on. For instance:

| Input data | CRC |
|---|---|
| 0xAA 0x55 0xAA 0x00 0x00 0x11 0x22 0x33 0x44 0x55 0x66 0x77 0x88 0x99 0xAA 0xBB 0xCC 0xDD 0xEE 0xFF | 0x88 |

-continued

| Input data | CRC |
|---|---|
| 0xFF 0x00 0xFF 0x71 0x00 0x11 0x22 0x33 0x44 0x55 0x66 0x77 0x88 0x99 0xAA 0xBB 0xCC 0xDD 0xEE 0xFF | 0x88 |

To summarize, the remapping value as explained above generally allows for the original CRC over the whole message to still be correct despite part of the message changing. This is the core idea behind the present disclosure and brings real value to other applications. For instance, in some exemplary protocols, the data length may be over a kilobyte (KB). The techniques proposed herein would then allow the remapper to be able to blindly (or, in other words, without the need to check as illustrated earlier) remap the message and let the receiver deal with whether the CRC over the whole message is valid, thereby allowing for highly efficient implementation of the remapper.

Furthermore, the protection using the proposed techniques may be considered end-to-end, since any fault in the interconnect (between transmitter end and the receiver end), including in the remapper, would be able to cause the CRC to be incorrect when being checked at the other end.

Now, it may be worthwhile to describe in more detail how the remapping value could be possibly calculated, particularly by showcasing some of the exemplary implementations for assisting understanding thereof. It is nevertheless to be noted that, the exemplary implementations for calculating the remapping values are merely served as examples for understanding the proposed techniques, and thus should in no way be considered as limitations of any kind. Certainly, the remapping value may be determined (e.g., calculated) in any other suitable means, as can be understood and appreciated by the skilled person. Moreover, exemplary implementations proposed herein are under the general assumption of CRC being used as the check value techniques. That is to say, when applying the concept of "remapping value" to other possible check value implementations, further modification and/or adaption may become necessary.

Generally speaking, a good check value algorithm, such as the CRC, should be able to (uniquely) map between two states of the checker. For example, to map between a CRC of 0xBE and 0xEF there is one (and ideally only one) "remap_value" (of the same length as the CRC) that would be able to achieve this—0xF4 in the case of polynomial 0x12F used for the CRC implementation.

Because of this quality, it may generally be able to effectively "reverse" one byte of the CRC. Put differently in simple words, instead of asking "given the current value of the CRC, and the remap_value, what would be the new CRC?", it may be asked, "given the current value of the CRC, and the new CRC value, what is the remap_value?"

A simple example of this would now be illustrated by using an exemplary CRC polynomial $P(x)=x^4+x^0$.

As can be understood and appreciated by the skilled person, this would generally be seen as nibble-wise XOR, i.e., CRC(0x1,0x2)=0b0001^0b0010=0b0011=0x3. Similarly, CRC(0xE,0xF)=0x1.

Accordingly, it may be written as

CRC_NEW=CRC_OLD^DATA_NEW, where CRC_NEW, CRC_OLD, DATA_NEW may be all 4 bits long (or any other suitable length in some possible implementations), for example.

Then, it may be rearranged to calculate the data in terms of the old and new CRC values:

DATA_NEW=CRC_OLD^CRC_NEW.

Applying the above to the previous example would then give CRC_REV(0x1,0x3)=0x02 and CRC_REV(0xE,0x1)=0xF, where CRC_REV is used to denote the reversed CRC operation.

Keep the above concept in mind, it could now be applied to a more real example, say, assuming the old (before remapping) address FROM_ADDRESS=0xC0FF and the new (after remapping) address TO_ADDRESS=0xEEEE, then the target and current CRC values could be respectively calculated as:

target_crc=CRC*({FROM_ADDRESS,CR-
C_LEN'b0})=CRC({0xC0FF,0x0})=0xC; and current_crc=CRC*(TO_ADDRESS)=CRC
(0xEEEE)=0x0.

Then, applying the "reverse" operation as illustrated above, the respective remapping may be calculated as:

remap_value=CRC_REV(current_crc,
target_crc)=CRC_REV(0x0,0xC)=0xC.

Notably, it does generally not matter how these CRCs would be actually calculated, provided that the final value is correct. For instance, in some possible implementations, further applying the concept of parallel implementation, the calculation might just look something like CRC[n]=DATA[0+n]^DATA[4+n]^DATA[8+n] . . . , depending on the value of n.

To summarize, in view of the above illustration, the initial (first) message (i.e., before remapping) may be denoted as:

{0xC0FF,0x0,DATA,CRC}, whilst the corresponding final (second) message (i.e., after remapping) may be denoted as:

{0xEEEE,0xC,DATA,CRC}.

As mentioned above, this could easily be checked or verified (e.g., by using an online calculator).

It may nevertheless be noted that, in some possible implementations, some (additional) care may have to be taken, since some possible CRC schemes may tend to apply the so-called "final xor" operation. For these calculations, the intermediate values of the CRC may be generally of interest, not the final values. Accordingly, this "final xor" should generally be avoided.

As indicated earlier, the same process may be applied to any other CRC implementations as well (possibly with necessary modification and/or adaptation, if necessary). Now, the polynomial 0x12F may be used as another example below, for further illustrative purposes.

Particular, in such a case, the following calculations may be performed.

crc_new[0]=remap[0]^remap[3]^remap[5]^
remap[7]^crc[0]^crc[3]^crc[5]^crc[7]

crc_new[1]=remap[0]^remap[1]^remap[3]^
remap[4]^remap[5]^remap[6]^remap[7]^
crc[0]^crc[1]^crc[3]^crc[4]^crc[5]^crc[6]^crc[7]

crc_new[2]=remap[0]^remap[1]^remap[2]^
remap[3]^remap[4]^remap[6]^crc[0]^crc[1]^
crc[2]^crc[3]^crc[4]^crc[6]

crc_new[3]=remap[0]^remap[1]^remap[2]^
remap[4]^crc[0]^crc[1]^crc[2]^crc[4]

crc_new[4]=remap[1]^remap[2]^remap[3]^
remap[5]^crc[1]^crc[2]^crc[3]^crc[5]

crc_new[5]=remap[0]^remap[2]^remap[4]^
remap[5]^remap[6]^remap[7]^crc[0]^crc[2]^
crc[4]^crc[5]^crc[6]^crc[7]

crc_new[6]=remap[1]^remap[3]^remap[5]^
remap[6]^remap[7]^crc[1]^crc[3]^crc[5]^
crc[6]^crc[7]

crc_new[7]=remap[2]^remap[4]^remap[6]^
remap[7]^crc[2]^crc[4]^crc[6]^crc[7]

In the above example, generally speaking, the equations are calculated by taking a feedforward implementation of the polynomial 0x12F containing initial data "crc" and clocking in new data "remap". Of course, as will be understood and appreciated by the skilled person, any other suitable ways of calculation may be implemented as well.

In some possible implementations, Gaussian elimination may then be applied to give remap as a function of crc and crc_new, for example:

remap[0]=crc[0]^crc_new[1]^crc_new[4]^crc_new[7]

remap[1]=crc[1]^crc_new[0]^crc_new[1]^crc_
new[2]^crc_new[4]^crc_new[5]^crc_new[7]

remap[2]=crc[2]^crc_new[0]^crc_new[2]^crc_
new[3]^crc_new[4]^crc_new[5]^crc_
new[6]^crc_new[7]

remap[3]=crc[3]^crc_new[3]^crc_new[5]^crc_new[6]

remap[4]=crc[4]^crc_new[4]^crc_new[6]^crc_new[7]

remap[5]=crc[5]^crc_new[1]^crc_new[4]^crc_new[5]

remap[6]=crc[6]^crc_new[2]^crc_new[5]^crc_new[6]

remap[7]=crc[7]^crc_new[0]^crc_new[3]^crc_new[6]^crc_new[7]

Applying the above calculation to the first example given in this section, i.e., where crc=0xBE (0b1011_1110) and crc_new=0xEF (0b1110_1111), would yield:

| remap [0] | 0 ^ 1 ^ 0 ^ 1 | 0 |
| remap [1] | 1^1^1^1^0^1^1 | 0 |
| remap [2] | 1^1^1^1^0^1^1^1 | 1 |
| remap [3] | 1^1^1^1 | 0 |
| remap [4] | 1^0^1^1 | 1 |
| remap [5] | 1^1^0^1 | 1 |
| remap [6] | 0^1^1^1 | 1 |
| remap [7] | 1^1^1^1^1 | 1 |

Consequently, the remapping value would be determined as remap=0b1111_0100=0xF4.

Now, yet a further possible (simplified) implementation for calculating the remapping value will be illustratively described.

Specifically, a (non-feedforward) CRC may be typically calculated as follows:

$$CRC(A)=F(\{A,CRC\_LEN*0\})=a,$$

where F generally denotes a function applied to a message A with 0s being appended to the end. In some possible hardware implementations, F may typically be implemented using shift registers and XOR gates.

This is calculating the remainder when the message A is divided by the CRC polynomial. The remainder can then be subtracted from the message, giving a new message of {A, a} such that F({A, a})=0.

To get a non-zero value out of the CRC, the target value can then be added (e.g., by using XOR operations), i.e. F({A, a^x})=x, which is generally considered as a core operation used to get the remapping values between two messages.

As an illustrative example, in order to have the CRC of the second message (message 2) to be the same as that of the first message (message 1), it may be generally assumed the following:

Message 1: $CRC(A)=F(\{A,CRC\_LEN*0\})=a$; and

Message 2: $CRC(B)=F(\{B,CRC\_LEN*0\})=b$.

Now, applying the above-illustrated concept, to make the CRC of Message 2 equal 0 (i.e., subtracting the remainder):

Message 2: $F(\{B,b\})=0$.

Then, the new wanted remainder (a) is added:

Message 2: $F(\{B,b\hat{}a\})=a$.

In some possible implementations, chaining of this operation may be further done for a third message (notably, the third message may depend only on the original message and the latest one, in some possible cases), e.g.:

Message 2: $F(\{B,b\hat{}a\})=a$; and

Message 3: $CRC(C)=F(\{C,CRC\_LEN*0\})=c$.

Similar to above, setting the remainder to 0 would yield {C, c} and setting the remainder to a would yield {C, c^a}.

The above concept could be formulated into a more general form as follows:

Previous message: $F(\{M,REMAP\_VAL\})$=remap_target (where REMAP_VAL is 0 in the first stage before it is set);

New message remainder: $F(\{N,0\})=n$; and

New message remapped:
{N,NEW_REMAP_VAL}={N,n^remap_target}.

Now, for ease of understanding, the above-illustrated scheme is illustratively applied to an example using non-feedforward CRC-Polynomial 0x12F with the initial value of 7D.

| Msg | Address | F({Addr, 0}) | Remap_target | Remap_VAL | Msg |
|---|---|---|---|---|---|
| 1 | 0xDE | F(DE, 00) = 5C | 5C (no remap) | 5C ^ 5C = 00 | DE, 00 |
| 2 | 0xAD | F(AD, 00) = 16 | F(DE, 00) = 5C | 16 ^ 5C = 4A | AD, 4A |
| 3 | 0xBE | F(BE, 00) = C9 | F(AD, 4A) = 5C | C9 ^ 5C = 95 | BE, 95 |
| 4 | 0xEF | F(EF, 00) = AE | F(BE, 95) = 5C | AE ^ 5C = F2 | EF, F2 |

As shown in the above table, all messages 1 to 4 give the same CRC value of 0x5C (under the assumption of polynomial of 0x12F, initial value of 0xFF, and final XOR of 0xFF).

Extending the above implementation for longer CRCs would also become trivial using this method. A possible example is also schematically shown below mainly for illustrative purposes.

| Msg | Address | F({Addr, 0}) | Remap_VAL | Message |
|---|---|---|---|---|
| 1 | DEADBEEF | 7E25E5E7 (target for all messages) | 00000000 | DEADBEEF, 00000000 |
| 2 | COFFEEEE | 7F181783 | 7E25E5E7 ^ 7F181783 = 013DF264 | COFFEEEE, 013DF264 |
| 3 | ABADCAFE | 6E13EE45 | 7E25E5E7 ^ 6E13EE45 = 10360BA2 | ABADCAFE, 10360BA2 |
| 4 | CA71CA71 | 56978311 | 7E25E5E7 ^ 56978311 = 28B266F6 | CA71CA71, 28B266F6 |

As may be easily checked or verified, under the assumption of polynomial of 0x4C11DB7 with no reflected data, initial value of 0xFFFFFFFF, and final XOR of 0xFFFFFFFF, all messages 1 to 4 would give the same CRC value 0x5F05BFD5.

Now that several possible implementations as to how the remapping values could be possibly determined (e.g., calculated) have been illustrated above in great detail, some possible embodiments of the techniques proposed in the present disclosure may be described below.

Figure 2:
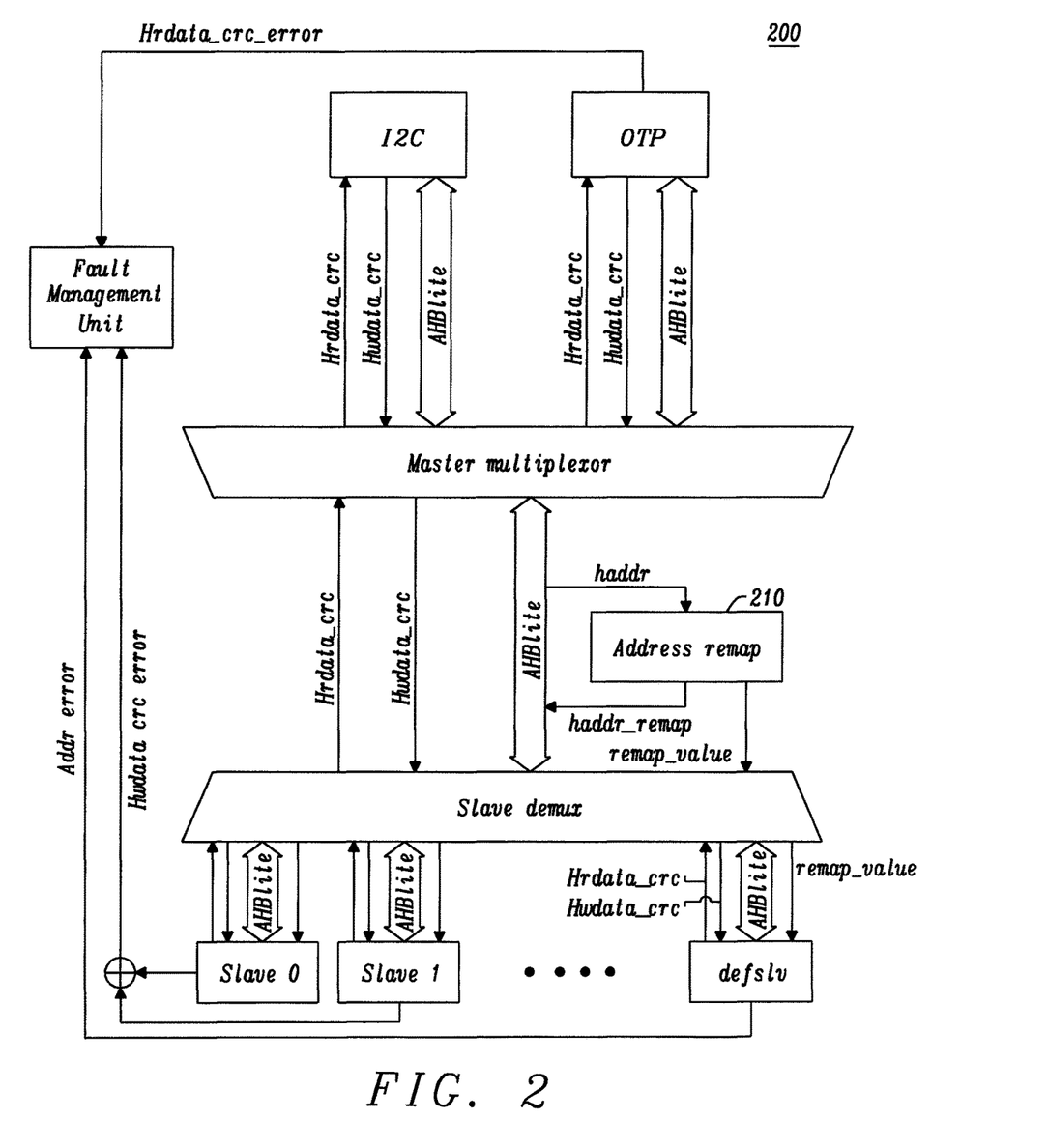
Figure 3:
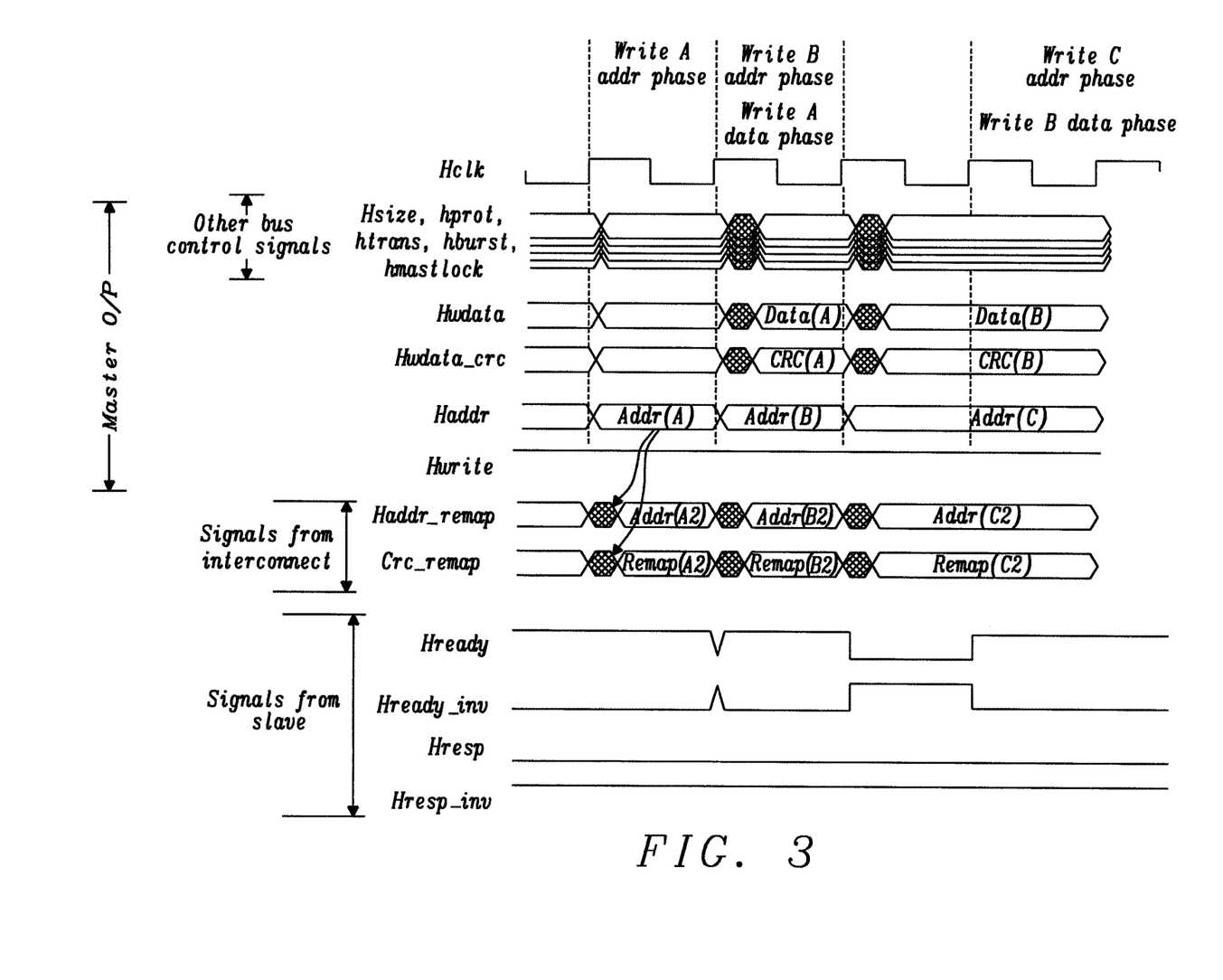
Figure 4:
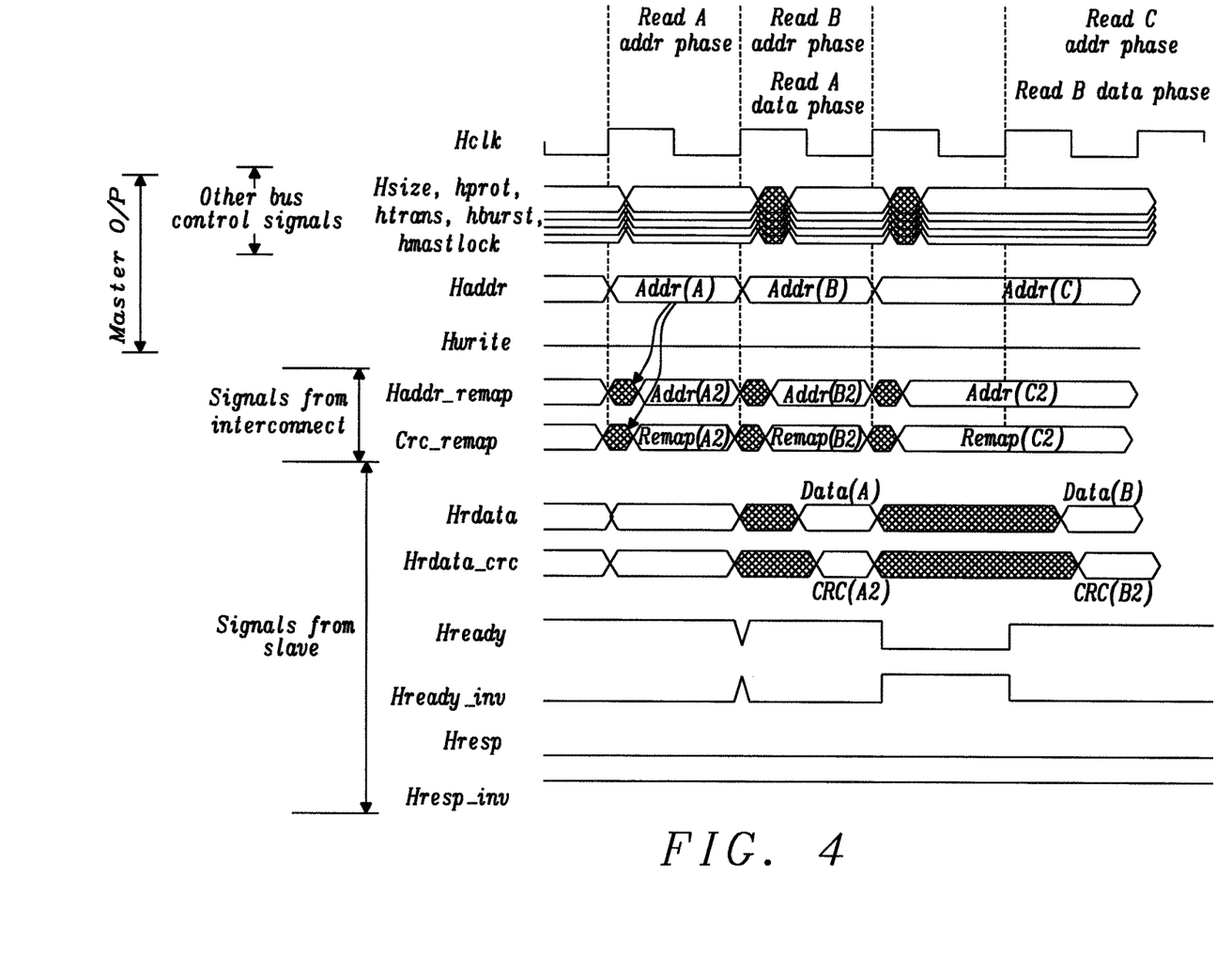

Particularly, FIGS. 2-4 schematically show possible embodiments by using a bus-based system (more precisely, the AHB (Advanced High-performance Bus) Lite) as an illustrative example. More particularly, therein, FIG. 2 schematically illustrates an exemplary system overview 200 of a bus design with a remapper according to embodiments of the present disclosure; FIG. 3 schematically illustrates an example of a timing diagram of bus write operations with CRC according to embodiments of the present disclosure; and FIG. 4 schematically illustrates an example of a timing diagram of bus read operations with CRC according to embodiments of the present disclosure. However, as will be understood and appreciated by the skilled person, such a bus-based system merely serves as an illustrative example, but not as a limitation of any kind. The techniques as proposed throughout the present disclosure may certainly be applied to other suitable systems as well (with possible modifications and/or adaptations, if necessary). Moreover, it is also to be noted that, since—generally speaking—the AHB Lite is considered to be a relatively common protocol to the person skilled in the field (e.g., the automotive industry), description for some of the already well-known system blocks (or components) may be omitted for the sake of conciseness. Specifically, the signals (message exchanges) that are considered to be of particular interest or relevance to the embodiments of the present disclosure are shown in solid arrows in FIG. 2.

Referring to the exemplary system 200 as shown in FIG. 2, generally speaking, during the address phase, the remapping value may be updated (e.g., calculated by using any of the schemes illustrated above) by the address remapper 210 if (and possibly only if) the address is being remapped. Otherwise, in some possible implementations, the remapping value may be left as 0.

In such a system, errors would typically be detected by a master (device) in the case of a read fail or by a slave (device) in the case of a write fail.

To be more specific, with reference to FIG. 3, on bus write, the CRC may be calculated by the master over the following message:

{ADDR_LEN'Address,CRC_LEN'0,DATA_LEN'data} where the terms "ADDR_LEN", "CRC_LEN" and "DATA_LEN" denote respective lengths (as the names indicate). As indicated above, the bus control signals may be considered to be part of the (payload) data to send.

The Hwdata_crc is then updated to be the calculated CRC value.

If this address is being remapped, the remapper 210 would update the remap_value accordingly, such that:

CRC(ADDR_LEN'old_addr,CRC_LEN'0)==CRC(ADDR_LEN'new_addr,CRC_LEN'remap_value).

This is then checked by the slave in the same order, namely:

{ADDR_LEN'new_addr,CRC_LEN'remap_value, DATA_LEN'data,CRC_LEN'hwdata_crc}.

Generally speaking, the CRC and/or remapping values may be implemented to follow the same specification as the data for the protocol (e.g., AHB, APB (Advanced Peripheral Bus), or any other suitable protocol). In such cases, Hwdata_crc would generally follow Hwdata (similarly, Hrdata_crc would generally follow Hrdata in case of bus read as shown in FIG. 3) and the remapping value would follow the address phase. Imposing this limitation would generally mean that not all signals could be protected. For instance, during a write cycle (phase), the slave may only provide Hready and Hresp signals. As a result, these signals would have to be protected in another way (e.g., based on the inverted duplicate signal Hready_inv shown below).

More particularly, following the example of AHB Lite bus-based system 200 in the technical field of automotive, the CRC(A) may be defined as follows, such that the whole message could pass the respective CRC check (e.g., the AUTOSTAR CRC):

Accordingly, the Remap(A2) would be defined as follows, such that the whole message could also pass the respective CRC check (e.g., the AUTOSTAR CRC) when being checked by the slave:

In a similar manner, in cases of bus read operations as shown in FIG. 3, the slave would calculate the CRC(A2) define as follows, such that the whole message could pass the respective CRC check (e.g., the AUTOSTAR CRC):

Correspondingly, in such cases, the master would then check the data as follows, such that the whole message could also pass the respective CRC check (e.g., the AUTOSTAR CRC):

As illustrated above, by calculating and inserting the remapping value, in cases when a message is partially updated/remapped/modified for example by the remapper, the check value over the whole (partially updated) message would still be correct. As such, the old check value would generally not need to be confirmed to be correct when performing the partial update. This could save processing power and/or area on the remapper, especially if most of the message is unmodified. In contrast, in conventional techniques, a new check value would have to be generated whenever the message is partially updated by a remapping device. Generating a new check value would generally require to first check whether the old message (before being remapped) is still valid, since otherwise it could have been corrupted between the transmitter and the remapper. Furthermore, since the remapper block would generally have no way of generating "good values", i.e., a CRC generation logic, it is inherently safe. In other words, any fault in the remapper would be able to be detected by the receiver. Yet further, in some possible cases, if all mappings between the old data blocks (i.e., before remapping) and the new data blocks (i.e., after remapping) are already known, then the remapping values may be computed in advance, thereby significantly reducing the complexity and area of the remapper itself. In addition, by using the techniques as proposed in the present disclosure, it may be possible to further allow for a more robust system design that may be futureproofing against standards updates. IP reuse could also be achieved, saving valuable development and verification time. Moreover, specifically in the case of bus-based systems, the proposed techniques may bring additional area advantages, since the same address decoder and/or multiplexor logic could be largely reused.

It is to be noted that, apart from the above-described embodiments, the present disclosure may as well cover other embodiments that may be considered as possible enhancements or alternatives, some of which will be discussed in more detail below.

In particular, as has been illustratively described above already, the techniques proposed in the present disclosure may be applied to cases where the address (field or region) might be changed or updated by a remapper. However, it may be understood that the techniques may be analogously or similarly applicable to cases where the data (or part thereof) might be modified.

For example (where unchanged values are shown in bold), the above-illustrated notion of {address,0,data,CRC}→{new_address,remap_value, data,CRC} would now become:

{address,data_1,0,data_2,CRC}→{address, data_1_modified,remap_value,data_2,CRC}).

As will be understood and appreciated by the skilled person, the techniques described above (e.g., the calculation of the remapping values) for cases where the address is being remapped may be equally or similarly applied here. Thus, the respective description thereof may be omitted for the sake of conciseness.

In some possible implementations, to increase the granularity of error detection, it may also be possible to include a (separate) CRC checker within the remapper itself. However, this would generally be up to the decision of the respective designer and may be considered as a tradeoff between ease of debugging and design area.

Moreover, in some possible implementations where there would be multiple (more than one) remappers being deployed in the system (between the transmitter and the receiver) and operating on the same (payload) data, different approaches may be adopted, depending on various implementations and/or requirements.

As one example, it may be proposed to, for each remapper stage, compute an additional byte (i.e., 8 bits, or of other suitable lengths according to various implementations) of 0's as part of the CRC similar to the above illustration; and to calculate and pass an additional remapping value to the slave.

Generally speaking, this approach would simplify the design of the slave(s) since it would always calculate the CRC over the same length of data. Though in some possible cases, it may also be possible to avoid this for example by using sideband signals (e.g., being implemented in the form of a flag such as remapped_by_stage_1, or any other suitable form). However, this might significantly increase design complexity for multiple stages of remappers.

Taking the cases of two remappers as an illustrative example, the first remapper would generally perform the following:

CRC(ADDR_LEN'old_addr,CRC_LEN'0,CR-C_LEN'0)==CRC(ADDR_LEN'new_addr1,CR-C_LEN'0,CRC_LEN'remap_value1).

Subsequently, the second remapper would then perform the following:

CRC(ADDR_LEN'new_addr1,CRC_LEN'0)==CRC (ADDR_LEN'new_addr2,CRC_LEN're-map_value2), such that the overall CRC is unchanged:

CRC(ADDR_LEN'old_addr,CRC_LEN'0,CR-C_LEN'0)==CRC(ADDR_LEN'new_addr2,CR-C_LEN'remap_value2,CRC_LEN're-map_value1).

As would be understood and appreciated by the skilled person, the above exemplary calculation of remapping values could be easily extended to other numbers (e.g., more than two) of a plurality of remapping devices.

As another example, it may be alternatively proposed to implement the remapper to include the previous remapping value in its own calculation, for example as follows:

target_crc=CRC(old_addr,old_remap).

This approach generally means that only one remapping value would be needed at the end, and thus may simply be overwritten by subsequent (remapping) stages.

Still taking the cases of two remapper as an illustrative example, and further assuming that initial_address=0x0000, intermediate_address=0x1111, and final_address=0x2222, in the first remapper (note the extra byte of 0's since the remapping value has not been set by any previous stage):

target_crc=CRC(0x0000,0x00)=0x69;

current_crc=CRC(0x1111)=0xF5; and remap_value=REV_CRC(0xF5,0x69)=0x4D.

As a result, the new message (at the first remapper)={0x1111, 0x4D, DATA, CRC}.
Then, for the second remapper:

target_crc=CRC(0x1111,0x4D)=0x69 (as expected, the same as the original target);

current_crc=CRC(0x2222)=0x22;

remap_value=REV_CRC(0x22,0x69)=0x9A.

Accordingly, the new_message2 (at the second remapper)={0x2222, 0x9A, DATA, CRC}.

Notably, as can be seen from the above illustration, the (padding) byte of 0's is typically inserted as part of the (initial) CRC calculation.

However, in some implementations, it may also be possible for the transmitter (e.g., the master device) to skip the byte of 0's during the CRC calculation and instead perform the following:

CRC(ADDR_LEN'old_addr)==
      CRC(ADDR_LEN'new_addr,CRC_LEN're-
      map_value).

The issue with such an approach would generally be when the address is not being remapped, the remapping value would still have to be calculated; and, as a consequence, likely to result in increasing the overall area for example for hardware implementation.

It is nevertheless to be noted that, in some other possible standards (such as Ethernet), this may become a preferred approach, as it generally allows the remap to be skipped entirely, thereby making the protocol backward compatible.

As an illustrative example, this could be implemented similarly to the 802.1Q Header in Ethernet. Specifically, without a remapper, the packet may generally look like:

{Preamble,Dest,Source,EtherType,Payload,CRC}.

On the other hand, i.e., with remapper(s), the packet may instead look like:

{Preamble,Dest,Source,Remap_present,remap,
      EtherType,Payload,CRC}, where "Remap_present" may for example be a constant defined in a standard (e.g., equivalent to 0x8100 in 802.1Q). Notably, in these cases, only one remap value would generally be needed, as explained above.

Accordingly, by applying the similar notions above, the remapper equations would then become something like:

target_crc=CRC(Dest,Source)

current_crc=CRC(new_Dest,new_Source,Remap_present)

remap_value=CRC_REV(current_crc,target_crc)

At the receiver, "remap_present" and "remap" would feed into the CRC calculation (over the whole message) but would otherwise be unused.

Yet further, in some possible implementations, it would be also possible to include the changed data (e.g., the remapped address) and remap_value in any order, such as:
   CRC(CRC_LEN'0,32'old_addr)==CRC(CRC_LEN-
      'remap_value,32'new_addr).

Accordingly, this would then be checked by the slave in the same order, such as:
   {CRC_LEN'remap_value,32'new_addr,8'data,CR-
      C_LEN'CRC}.

Figure 5:
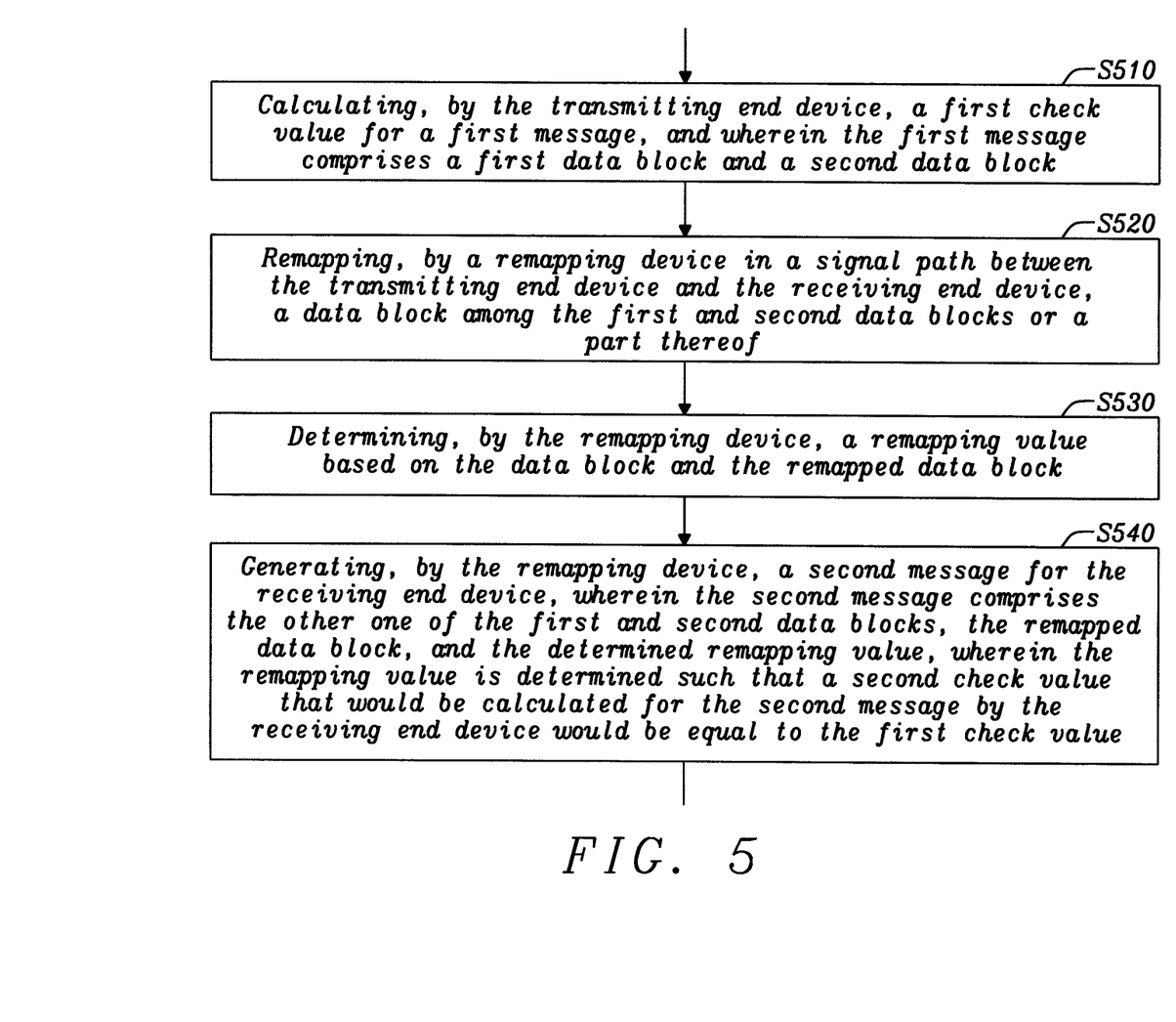
FIG. 5 is a flowchart schematically illustrating an example of a method for providing end-to-end data protection between a transmitting end device and a receiving end device according to embodiments of the present disclosure.

Finally, as schematically shown in FIG. 5, a flowchart illustrating an example of a method 500 for providing end-to-end data protection between a transmitting end device and a receiving end device according to an embodiment of the present disclosure. For instance, the transmitting end device may be a master device, and the receiving end device may be a slave device in the technical context of a bus-based system, as illustrated above. Method 500 may comprise, at step S510, calculating, by the transmitting end device, a first check value for a first message, wherein the first message may comprise a first data block and a second data block. Method 500 may further comprise, at step S520, remapping, by a remapping device in a signal path between the transmitting end device and the receiving end device, a data block among the first and second data blocks or a part thereof. Method 500 may yet further comprise, at step S530 determining, by the remapping device, a remapping value based on the data block and the remapped data block. Finally, the method 500 may comprise, at step S540 generating, by the remapping device, a second message for the receiving end device, wherein the second message may comprise the other one of the first and second data blocks, the remapped data block, and the determined remapping value. More particularly, the remapping value may be determined such that a second check value that would be calculated for the second message by the receiving end device would be equal to the first check value.

Configured as proposed above, specifically by calculating and inserting the remapping value (by the remapping device), in cases when a message (e.g., a data block therein) is partially updated/remapped/modified for example by a "remapper", the check value over the whole (partially updated) message would still be correct. As such, the old check value would generally not need to be confirmed to be correct when performing the partial update (by a remapping device or remapper). This could save processing power and/or area on the remapper, especially if most of the message is unmodified. In contrast, in conventional techniques, a new check value would have to be generated whenever the message is partially updated by a remapping device. Generating a new check value would generally require to first check whether the old message (before being remapped) is still valid, since otherwise it could have been corrupted between the transmitter and the remapper. Furthermore, since the remapper block would generally have no way of generating "good values", i.e., a CRC generation logic, it is inherently safe. In other words, any fault in the remapper would be able to be detected by the receiver. Yet further, in some possible cases, if all mappings between the old data blocks (i.e., before remapping) and the new data blocks (i.e., after remapping) are already known, then the remapping values may be computed in advance, thereby significantly reducing the complexity and area of the remapper itself. In addition, by using the techniques as proposed in the present disclosure, it may be possible to further allow for a more robust system design that may be futureproofing against standards updates. IP reuse could also be achieved, thereby saving valuable development and verification time.

It should be noted that the apparatus features described above correspond to respective method features that may however not be explicitly described, for reasons of conciseness. The disclosure of the present document is considered to extend also to such method features. In particular, the present disclosure is understood to relate to methods of operating the circuits described above, and/or to providing and/or arranging respective elements of these circuits.

It should further be noted that the description and drawings merely illustrate the principles of the proposed circuits and methods. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A system for providing end-to-end data protection between a transmitting end device and a receiving end device, the system comprising:
   the transmitting end device configured to calculate a first check value for a first message, wherein the first message comprises a first data block and a second data block;
   the receiving end device; and
   a remapping device in a signal path between the transmitting end device and the receiving end device, wherein the remapping device is configured to remap a data block among the first and second data blocks or a part thereof for generating a second message for the receiving end device,
   wherein the remapping device is further configured to determine a remapping value based on the data block and the remapped data block, such that a second check value that would be calculated for the second message would be equal to the first check value, and wherein the second message comprises the other one of the first and second data blocks, the remapped data block, and the remapping value.

2. The system according claim 1, wherein the first data block is payload data and the second data block is a first address associated with the payload data.

3. The system according to claim 2, wherein the remapping device is configured to remap the first address into a second address indicating the receiving end device.

4. The system according to claim 3, wherein the remapping device is configured to determine the remapping value based on the first and second addresses independently from the payload data.

5. The system according to claim 1, wherein the first message further comprises a padding block, wherein a length of the padding block is equal to a length of the remapping value, and wherein the padding block is to be replaced by the remapping value in the second message.

6. The system according to claim 1, wherein the second message further comprises a remapping flag indicative of whether the remapping device has performed the remapping.

7. The system according to claim 6, wherein the second check value is calculated further based on the remapping flag, and wherein the remapping value is determined further based on the remapping flag.

8. The system according to claim 1, wherein the system comprises a plurality of sequential remapping devices in the signal path, wherein a subsequent remapping device is configured to remap a data block among the first and second data blocks or a part thereof that has been remapped by a preceding remapping device, and wherein each remapping device is configured to determine a respective remapping value.

9. The system according to claim 8, wherein the second message comprises the other one of the first and second data blocks, the remapped data block, and the remapping values that are determined by the plurality of remapping devices.

10. The system according to claim 8, wherein the subsequent remapping device is configured to determine the remapping value further based on the remapping values that have been determined by any preceding remapping devices, and wherein the second message comprises the other one of the first and second data blocks, the remapped data block, and the respective remapping value that is determined by a last remapping device of the plurality of remapping devices.

11. The system according to claim 2, wherein the first address is arranged preceding the payload data in the first message.

12. The system according to claim 3, wherein the second address is arranged preceding the payload data in the second message.

13. The system according to claim 3, wherein the remapping value is inserted between the second address and the payload data in the second message.

14. The system according to claim 5 or any one of claims 6 to 13 when depending on claim 5, wherein the padding block is inserted between the first address and the payload data in the first message.

15. The system according claim 2, wherein the remapping device is configured to remap the payload data or a part thereof.

16. The system according to claim 1, wherein an error detection algorithm used for calculating the first and second check values involves XOR operations.

17. The system according to claim 1, wherein the remapping value is determined based on an inverse of an error detection algorithm used for calculating the first and second check values.

18. The system according to claim 1, wherein the remapping value is determined from a lookup table, LUT, or a linear equation.

19. The system according to claim 1, wherein an error detection algorithm used for calculating the first and second check values is a cyclic redundancy check, CRC, based algorithm.

20. The system according to claim 19, wherein a length of the remapping value is greater than or equal to a length of the check value calculated by using the CRC based algorithm.

21. The system according to claim 1, wherein the remapping device is configured to, before performing the remapping:
   calculate a check value based on the received first message sent from the transmitting end device; and
   compare the check value with the first check value, for detecting errors between the transmitting end device and the remapping device.

22. The system according to claim 1, wherein the system is a bus-based system; and wherein the transmitting end device is a master device, the receiving end device is a slave device, or vice versa.

23. The system according to claim 22, wherein the payload data comprises control signals indicative of operations for buses of the bus-based system.

24. The system according to claim 1, wherein the system is an ethernet-based system.

25. The system according to claim 1, wherein the remapping device is or forms part of a network address translation, NAT, device.

26. A method for providing end-to-end data protection between a transmitting end device and a receiving end device, the method comprising:
- calculating, by the transmitting end device, a first check value for a first message, and wherein the first message comprises a first data block and a second data block;
- remapping, by a remapping device in a signal path between the transmitting end device and the receiving end device, a data block among the first and second data blocks or a part thereof;
- determining, by the remapping device, a remapping value based on the data block and the remapped data block; and
- generating, by the remapping device, a second message for the receiving end device, wherein the second message comprises the other one of the first and second data blocks, the remapped data block, and the determined remapping value,
- wherein the remapping value is determined such that a second check value that would be calculated for the second message by the receiving end device would be equal to the first check value.

* * * * *